United States Patent [19]
Cato

[11] Patent Number: 5,874,724
[45] Date of Patent: Feb. 23, 1999

[54] LIGHT SELECTABLE RADIO FREQUENCY IDENTIFICATION TAG AND METHOD THEREFOR

[75] Inventor: Robert Thomas Cato, Raleigh, N.C.

[73] Assignee: International Business Machines Corporation, Armonk, N.Y.

[21] Appl. No.: 781,755

[22] Filed: Jan. 10, 1997

[51] Int. Cl.⁶ ...................................................... G06K 5/00
[52] U.S. Cl. .......................................... 235/492; 235/322
[58] Field of Search ..................................... 235/492, 382, 235/375, 454, 486, 487, 380

[56] References Cited

U.S. PATENT DOCUMENTS

| | | |
|---|---|---|
| 4,202,491 | 5/1980 | Suzuki . |
| 5,134,277 | 7/1992 | Yerbury et al. . |
| 5,280,159 | 1/1994 | Schultz et al. . |
| 5,349,332 | 9/1994 | Ferguson et al. . |
| 5,354,979 | 10/1994 | Adelson et al. . |
| 5,382,784 | 1/1995 | Eberhardt . |
| 5,430,441 | 7/1995 | Bickley et al. . |
| 5,484,997 | 1/1996 | Haynes . |
| 5,486,687 | 1/1996 | Le Roux ................................. 235/492 |
| 5,497,140 | 3/1996 | Tuttle . |
| 5,500,517 | 3/1996 | Cagliostro ................................ 235/487 |
| 5,526,233 | 6/1996 | Hayakawa ................................ 235/492 |
| 5,635,701 | 6/1997 | Gloton ..................................... 235/486 |
| 5,736,727 | 4/1998 | Nakata ..................................... 235/486 |

FOREIGN PATENT DOCUMENTS

| | | | |
|---|---|---|---|
| 0071389 | 3/1990 | Japan ..................................... 235/486 |
| 404205079A | 7/1992 | Japan ..................................... 235/486 |

*Primary Examiner*—Thien Minh Le
*Attorney, Agent, or Firm*—John D. Flynn; Winstead, Sechrest & Minick, PC

[57] ABSTRACT

A radio frequency identification (RFID) tag includes a photodetector which is receptive to a predefined wavelength and a control circuit which is receptive to a flash pattern of a light source. The RFID tag responds to a predefined command from RFID base station only if the photodetector included in the tag was activated by a light signal having an appropriate wavelength and flash pattern. During or after the photodetector circuit is activated, an operator of a pulsed light source then interrogates a single RFID tag with an unknown identification by using a pulsed light source to illuminate the particular tag. Only the tag illuminated by the pulsed light source responds to the reader.

26 Claims, 5 Drawing Sheets

5,874,724

LIGHT SELECTABLE RADIO FREQUENCY IDENTIFICATION TAG AND METHOD THEREFOR

TECHNICAL FIELD

The present invention relates in general to a radio frequency identification tag, and more particularly, to a light selectable radio frequency identification tag.

BACKGROUND INFORMATION

Radio frequency identification (RFID) technology uses electromagnetic energy as a medium through which to send information. Typically, RFID tags are devices which are affixed to various articles so that these articles may be easily tracked during movement from one point to another or identified during a sale transaction. Therefore, one may tag things such as assets, animals, and people so that they be identified or tracked automatically via a reader which is frequently connected to a host computer that may contain additional data tied to an object's identification number associated with the RFID tag. Furthermore, the RFID tag generally contains programmed information about an object to which it is attached. Through the use of such information, RFID technology may be used to identify objects automatically and without manual scanning operations as is required in most bar code systems.

An RFID tag typically includes a receiver and some type of transmitter, an antenna, and memory. Through the use of these components, RFID tags are enabled to receive, store, and transmit article-identifying data with a remote base station. RFID tags have been implemented using a variety of methodologies to allow a user to perform any number of desired identification finctions. For example, RFID tags may be read-only or read-write. Additionally, passive RFID tags may be implemented without batteries and draw their power from the radio frequency (RF) energy transmitted from the reader. As well, RFID tags may be low or high frequency depending on a user's desires.

While the variety of RFID tags described above work well for most situations, it is difficult to determine which RFID tag is being accessed by the base station when a large number of RFID tags are consolidated in a small area. Therefore, a need exists for an identification method which quickly and efficiently identifies individual items in a large group which is within a range of the base station.

SUMMARY OF THE INVENTION

The radio frequency identification tag includes the means for receiving a command signal. The radio frequency identification tag also includes a detector for detecting a directional signal and generating a detected signal in response to the directional signal. A digital control logic circuit is connected to the detector for receiving the detected signal and connected to the circuit for receiving the command signal. The digital control logic circuit performs an operation in response to the command signal when the detected signal has a first value.

Additionally, there is provided, in a second form, a method for performing radio frequency identification in a radio frequency identification tag. This method includes the steps of receiving a first command signal to enable the radio frequency identification tag to operate in a first mode of operation and detecting the directional signal and generating a detected signal in response to the directional signal. The method also includes the step of performing a first radio frequency identification operation in response to the first command signal when the detected signal has a first value.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention implements a radio frequency identification (RFID) tag which includes a photodetector which enables the RFID tag to be receptive to both a predefined wavelength and flash pattern of a light source. The RFID base station issues a special command to all the tags in a group to be read or evaluated; however, only the tag illuminated by the special light source responds to the reader. The RFID tag of the present invention is designed to respond to a predefined command from RFID base station only if the photodetector circuit included in the tag was activated by a light signal having an appropriate wavelength and flash pattern. An operator of a pulsed light source then interrogates a single RFID tag with an unknown identification by using a pulsed, directional light source to illuminate the particular tag.

Figure 5:
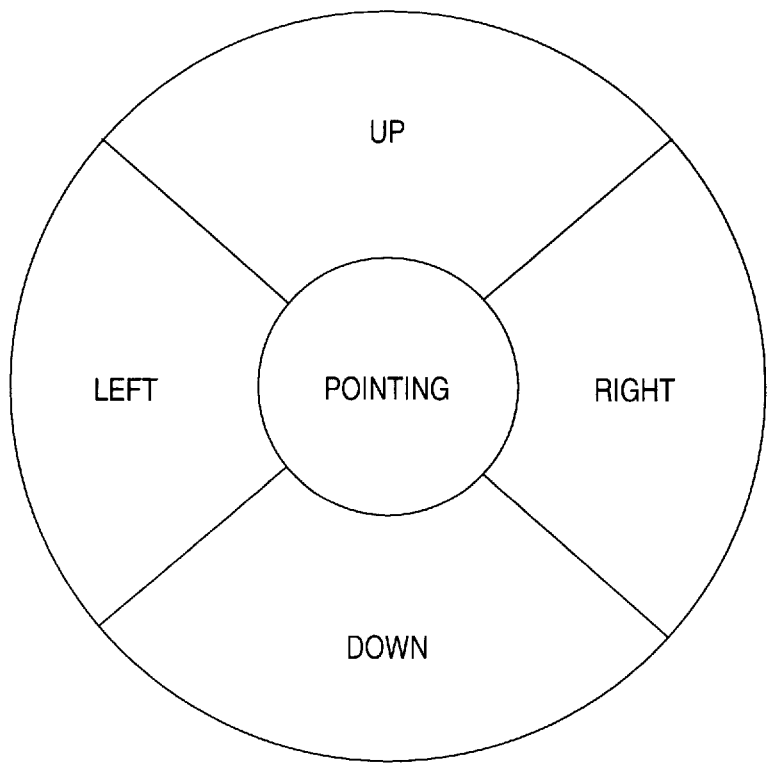
FIG. 5 illustrates, in block diagram form, a cross-sectional view of a composite beam provided by the pulsed light source of FIG. 2.

Furthermore, in the present invention, a composite directional light beam is utilized. The composite light beam includes a highly directional pointing beam which is surrounded by four less directional "helper" beams. A cross section of the composite light beam is illustrated in FIG. 5. Each beam's light source can be pulsed with a different binary code. When one of the helper beams is detected by a RFID tag, the RFID tag informs the base station whether a helper beam or a pointing beam is "hitting" it. Thus, the operator is informed as to whether or not the composite beam should be moved up, down, right or left in order for the pointing beam to directly hit the tag. The use of the helper beams makes the process of finding a desired tag similar to the child's game of finding something while someone is telling the searching child if they are getting "hotter" or "colder" to a hidden item. Therefore, the use of the helper beams reduces the time required to find the desired tag.

Operation of the present invention will subsequently be described in greater detail. It should be noted that during a following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1:
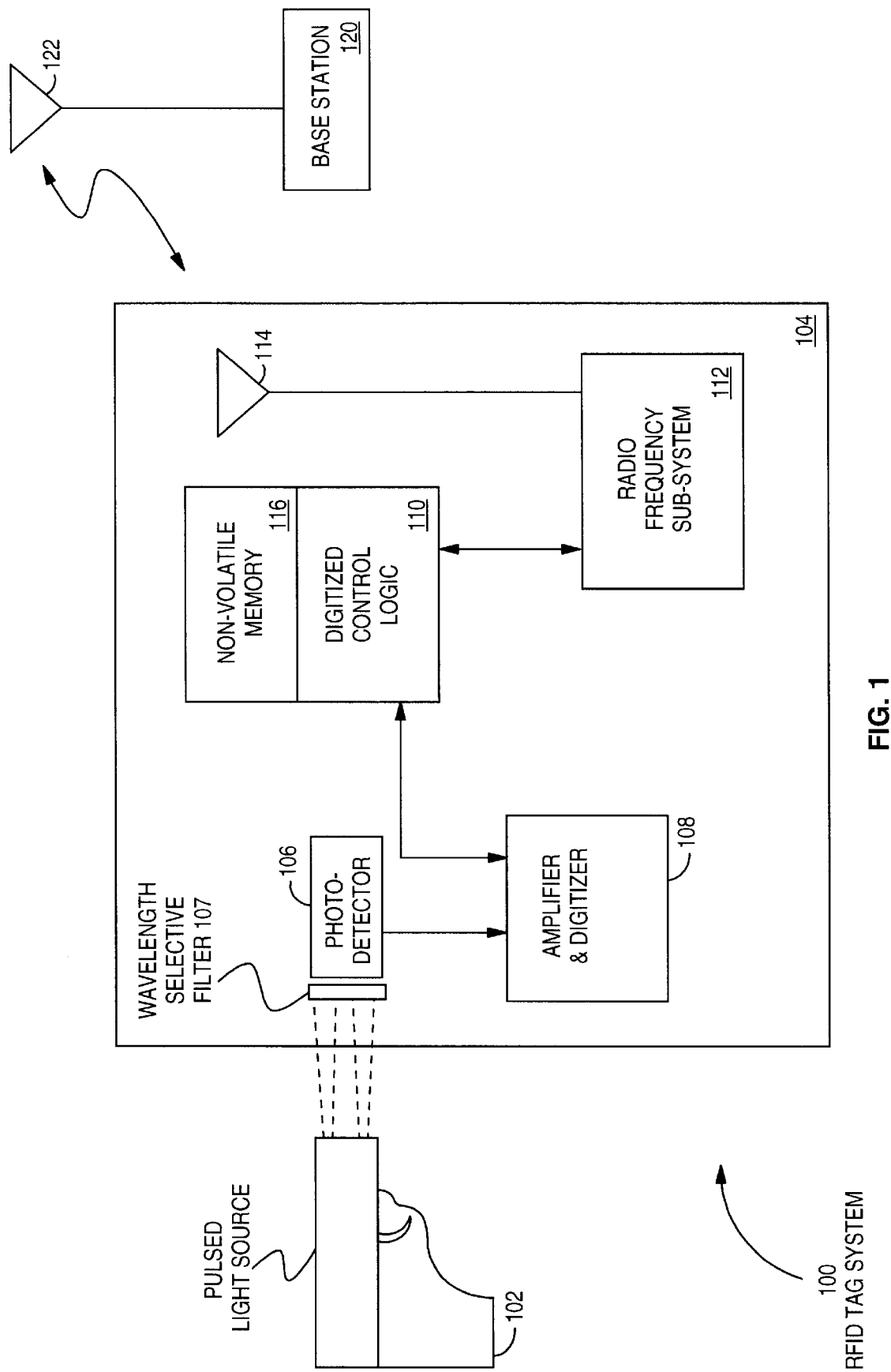
FIG. 1 illustrates, in block diagram form, a RFID tag system in accordance with the present invention.

FIG. 1 illustrates a tag identification system 100 which comprises a pulsed light source 102, a RFID tag 104, and a RFID base station 120. RFID tag 104 comprises a photodetector 106, a wavelength selective filter 107, an amplifier and digitizer 108, a digital control circuit I 10, a radio frequency sub-system 112, and an antenna 114. Radio frequency identification (RFID) base station 120 communicates information with RFID tag 104 via an antenna 122.

During operation of tag identification system 100, RFID base station 120 sends a radio frequency command to a group of RFID tags that an operator desires to find or identify via antenna 122. This technique is well-known to those with skill in the art and will function with existing RFID tag implementations. RFID base station 120 may provide a group command to one, several, or all of the tags in a group to be enabled for identification. By using this method, undesired tags are not enabled and, therefore, are prevented from responding to a directional signal source, such as a pulsed light source, and an amount of power consumed by such tags and the batteries required to provide that power are not consumed.

RFID base station 120 sends a radio frequency command to antenna 114 to enable operation of RFID tags via antenna 122. The information transferred to antenna 114 is provided to radio frequency sub-system 112. RFID tag radio subsystems, such as sub-system 112, vary greatly. Radio sub-systems use frequency modulation, phase shift modulation, and use amplitude modulation techniques (AM) which are well-known in the art and will not be described in greater detail herein.

An efficient AM modulation technique allows the tag to modify the termination of the tag's antenna from a matched impedance to a mismatched impedance while RFID base station 120 emits a constant amplitude carrier. This modification technique is performed by connecting a transistor to the leads of the tags antenna (not illustrated in detail herein). The transistor is then turned on and off to effectively modulate an amount of the RFID base station's carrier that is reflected off of the tag's antenna. The modulated signal is then picked up by the RFID base station. This method is particularly efficient in that it does not require the RFID tag to actually transmit any radio frequency (RF) power. Additionally, a simple AM receiver for a tag can be implemented by simply using a diode to demodulate the AM signal. The use of a diode to demodulate an AM signal is well-known to those with skill in the art.

Once RFID tag 104 is enabled to provide information, a directional signal source, such as pulsed light source 102, directs a light beam to photodetector 106 implemented on tag 104. Wavelength selective filter 107 is receptive to a predefined wavelength provided by pulsed light source 102. In one embodiment of the present invention, when photodetector 106 receives a light pulse sequence, then photodetector 106 converts the light pulse sequence to a plurality of electric pulses. The plurality of electric pulses are then provided to amplifier and digitizer 108. Amplifier and digitizer 108 digitizes the light pulse sequence to generate a digital code which is transferred to digital control logic 110.

It should be noted that photodetector 106 can be implemented as a photodiode or a phototransistor. Additionally, amplifier 108 can be implemented as an operational amplifier with appropriate frequency band limiting components. Furthermore, digitizer 108 can be implemented as a comparator. Such components and configurations are well-known in the data processing art and will not be described in greater detail Digital control logic 110 searches for the appropriate pulse sequences and determines the correct action to take. This function can be performed by software in a microprocessor or by specialized hardware. Radio frequency sub-system 112 receives information from RFID base station 120 via antenna 114 and passes this information to digital control logic 110. Digital control logic 110 then controls the radio frequency sub-system 112 in a manner which is dependent on the light pulse sequences provided above and on information received from the RFID base station. Similarly, radio frequency sub-system 112 transmits the information back to RFID base station 120 via antenna 114.

Thus, tag 104 will only provide information back to RFID base station 120 when tag 104 has been enabled and pulsed light source 102 provides a correct pulsed light source having a specified pattern and wavelength. Once the coded light pulse sequence is received, tag 104 executes a normal tag function. Normal RFID tag functions include reading and writing information stored in the tag or gathered by the tag, tag group selection (simultaneous multiple item identification), tag enable/disable, and data lock-once memory. The group of tags that have a photodetector as described herein would be an example of a group that may be a subset of all possible tag addresses. Such a group select address would be used for the "light select mode" command from RFID base station 120 that enables the tags to respond to the pulsed light source.

If the coded light pulse sequence was not received by the RFID tag, the RFID tag would next determine whether a "resume normal tag function" command had been received from the RFID tag base station 120. RFID base station 120 would provide a "resume normal tag function" command if the RFID base station did not require a pulsed light source to detect and identify a tag. If a "resume normal tag function" command is received from the RFID base station, tag 104 will begin to execute normal tag functions. Normal RFID tag functions are accomplished by coordination of RFID base station 120 and tag 104 without the use of a photodetector. The base station and tags, such as tag 104, use a specific protocol to enable the base station to determine what particular tags are present in a volume of space that is readable by the base station. Polling and binary search algorithms are just two of the numerous protocols that can be used.

Once RFID base station 120 determines which tags are in a particular read volume, RFID base station 120 can address communications to a particular tag. For example, a specific command can then be addressed to a particular tag, such as tag 104, to cause the tag's digital control logic 110 to respond in a desired way.

In the present invention, when RFID base station 120 transmits a command to read a data value, the command is detected by antenna 114 and subsequently passed to radio frequency sub-system 112. Radio frequency sub-system 112 processes the information and provides it to digital control logic 110. Digital control logic 110 subsequently provides the appropriate command and control signals to read the appropriate data value from non-volatile memory 116. The information read from non-volatile memory 116 is then processed by digital control logic 110 and communicated to radio frequency sub-system 112. Radio frequency sub-system 112 then transmits the requested data to RFID base station 120 via antenna 114. Similarly, if RFID base station 120 transmits a command to write a data value, the command will be received by antenna 114 of tag 104. Radio frequency sub-system 112 will process the information and transfer the appropriate data to digital control logic 110. Digital control logic 110 will provide the proper control and data to enable non-volatile memory 116 to be written with the correct data value. Once the data has been correctly written, digital control logic 110 will provide an acknowledgment that the data was correctly written to radio frequency sub-system 112. Radio frequency sub-system 112 subsequently transmits the acknowledgment to RFID base station 120 via antenna 114. In another example of a command operation executed in response to a request by RFID base station 120, assume RFID base station 120 transmits a "data-lock once" command. The "data-lock once" command is transferred to radio frequency sub-system 112 where it is processed to provide an information value to digital control logic 110. Digital control logic 110 subsequently provides the correct data values to set a bit or a register value in non-volatile memory 116 so that all or part of the contents of non-volatile memory 116 can never be modified.

Figure 2:
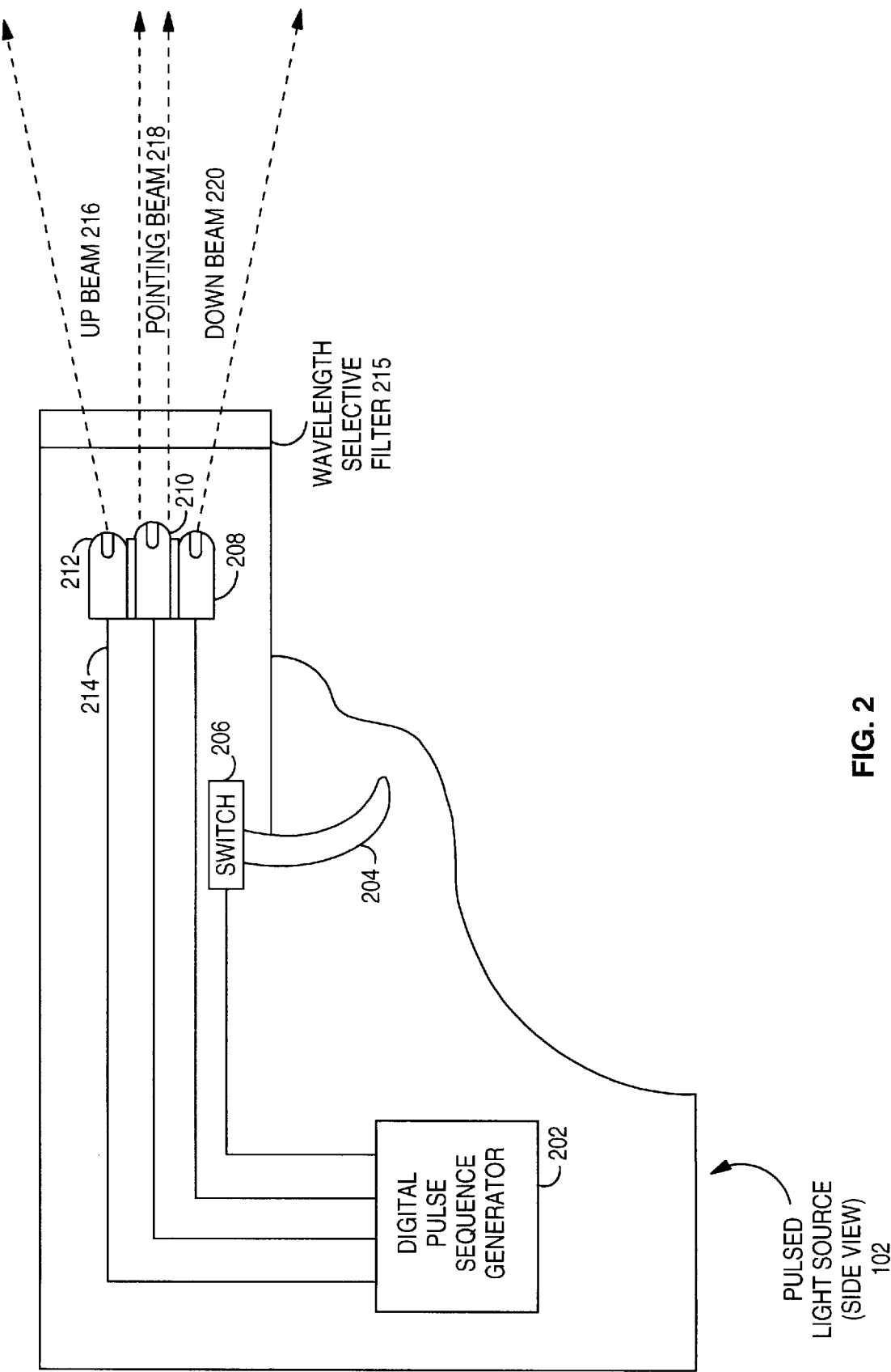
FIG. 2 illustrates, in block diagram form, a pulsed light source in accordance with the RFID tag system of FIG. 1.

FIG. 2 illustrates pulsed light source 102 in greater detail. Pulsed light source 102 comprises a pulse sequence generator 202, a trigger 204, a switch 206, a light source 214, and a wavelength selective filter 215. Light source 214 comprises an up-beam light source 212, a pointing beam light source 210, and a down-beam light source 208. Up-beam light source 212 is separated from pointing-beam light source 210 by an opaque beam separator. Similarly, pointing beam light source 210 is separated from down-beam light source 208 by an opaque beam separator. During operation of pulsed light source 102, point beam light source 210 provides a pointing beam 218 which is a narrow and concentrated light beam. Up-beam light source 212 generates an up-beam 216 which provides a diverging light source in an upward direction. As well, down-beam light source 208 provides a diverging down-beam 220.

Figure 3:
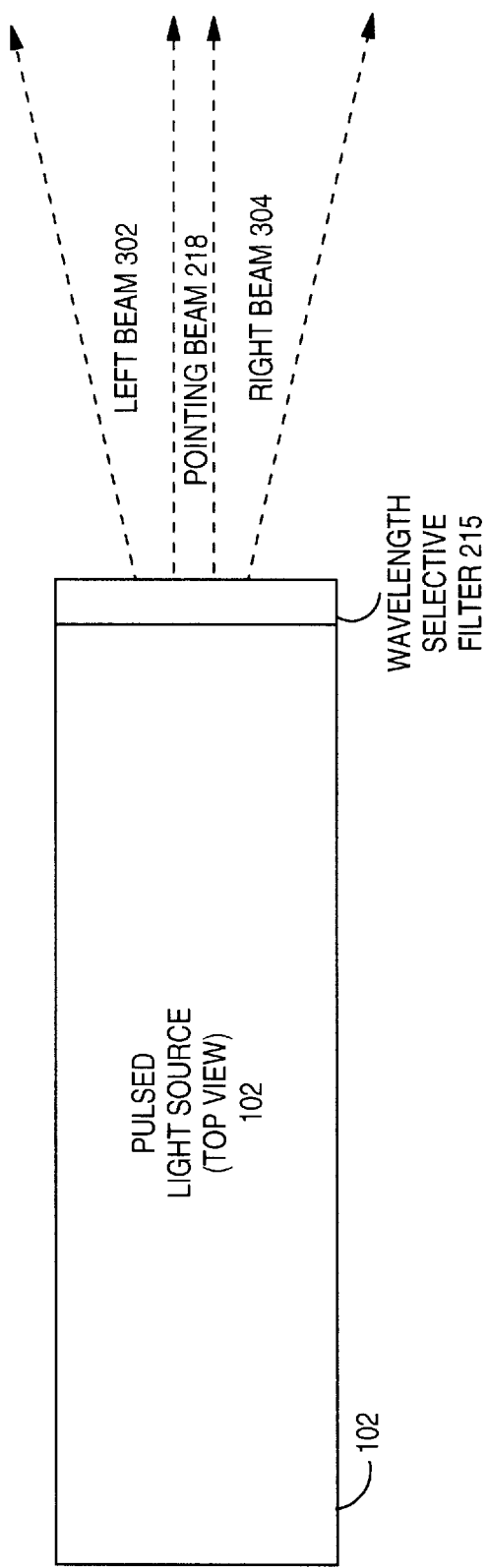
FIG. 3 illustrates, in a top view form, a side view of the pulsed light source of FIG. 2.

FIG. 3 illustrates pulsed light source 102 from a top view. As seen therein, pulsed light source 102 also generates a diverging left beam 302 and a diverging right beam 304 which provide light in the left and right positions, respectively. Pulsed light source 102 also provides a pointing beam 218. Each of left beam 302, right beam 304, and pointing beam 218 are output through wavelength selective filter 215. However, if LEDs are used to implement the light sources rather than Xenon bulbs, a wavelength selective filter is not required at the light source. In this case, the wavelength selective filter will be implemented only at photodetector 106.

The light sources may be implemented using a Xenon flash bulb for producing intense pulses of light or Light Emitting Diodes (LED's). It should also be apparent to those with skill in the data processing art that each of these light sources may be manufactured from any suitable source of radiation known generally as "light." Such sources of radiation include infrared, laser, and visible light. Electronic circuitry and a power supply are also included in pulsed light source 102, but are not illustrated herein.

For clarity, in the embodiment of the pulsed light source 102 illustrated in FIG. 2, trigger 204 enables switch 206 to selectively enable digital pulse sequence generator 202. The RFID base station issues the special command, previously referred to, to all the RFID tags in a group to be read, but only the RFID tag illuminated by the special light source responds to the RFID base station.

When activated, digital pulse sequence generator 202 enables each of up-beam light source 212, pointing-beam light source 210, down-beam light source 208, left beam source, and right beam source to generate a beam for use in enabling photodetector 106 (FIG. 1) and amplifier and digitizer 108 (FIG. 1) to communicate information with digital control logic 110. In response to the information, a signal is transmitted via antenna 114 to identify the tag which is being illuminated by the pulsed light source 102. Stated another way, an appropriate light wavelength is detected by photodetector 106, the detected signal is digitized and provided to digital control logic 110. Digital control logic 110 recognizes a particular light pattern. Subsequently, radio frequency sub-system 112 provides identifying information which is stored in non-volatile memory 116 to RFID base station 120 using antenna 114. Thus, an operator is able to interrogate a single RFID tag with an unknown identification number by using a special light source to illuminate the particular tag.

As previously mentioned, pulsed light source 102, provides a light source comprised of a pointing beam 218, an up-beam 216, a down-beam 220, a left beam 302, and a right beam 304. In one example of operation, the up, down, left, right, and pointing light sources can be pulsed in synchronization so that each will not conflict at the photodetector 106 of tag system 100. For example, a binary code transmitted on each beam could be a subset of another beam's code, with the code associated with pointing beam 218 is the longest. All of the light sources will flash at the same time, but each of the light sources will stop flashing at a different point in the sequence. For example:

Up-Beam=11101010100000000000000000
Down-Beam=1110101010100000000000000000
Right-Beam=111010101010100000000000000
Left-Beam=11101010101010100000000000
Pointing Beam=11101010101010101000000000

By using the same sequence and modifying only a length of time that a pulse is provided, the light sources may all be provided concurrently to identify a relative position of the pointing beam to the tag desired to be identified without confusing photodetector 106 of tag 104.

The use of up-beam 216, down-beam 220, left-beam 302, and right-beam 304 may be used to make a process of finding a desired RFID tag easier as pointing beam 218 is not required to be directly on tag 104 at an initial point in time. Rather, through the use of up beam, down beam, left beam, and right beam, a user of pulsed light source 102 may receive feedback information which allows that person to modify a position of pulsed light source 102 to direct pointing beam 218 directly to tag 104. The "helper" beams will be very helpful in finding a particular tag among many.

As previously described, RFID base station 120 issues a special command only to a tag desired to be accessed. Thus, only the desired tag would respond to the base station with the information about which helper beam is hitting it, if pointing beam 218 was not hitting it. In one implementation of the invention, the helper beams are much larger than pointing beam 218, so it is much more likely that one of the helper beams would hit a tag first. RFID base station 120 could then provide the user with information about which helper beam is hitting the desired tag and the user would then know which way to move the light beams in order to precisely locate and identify the desired tag.

Figure 4:
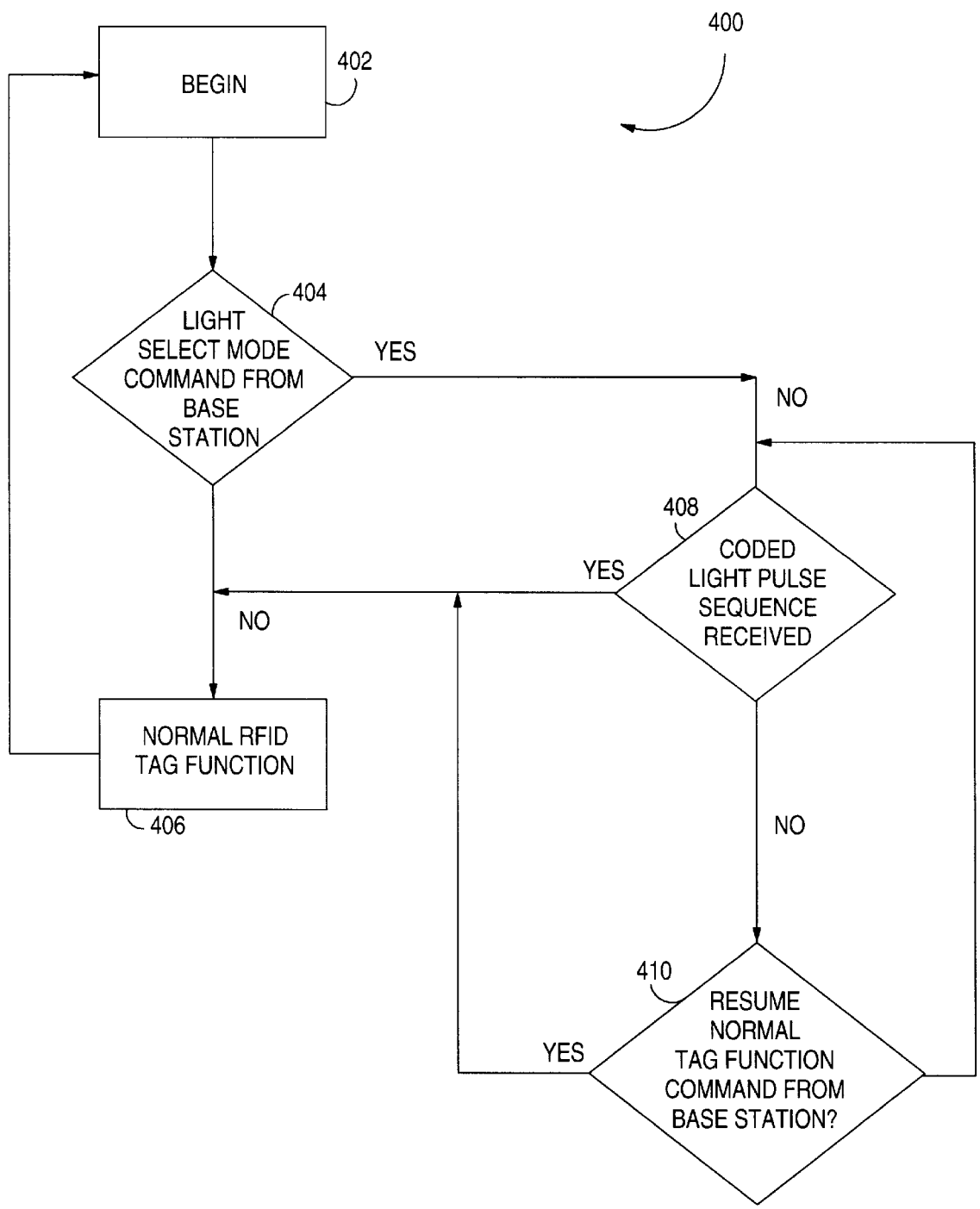
FIG. 4 illustrates, in flow diagram form, a methodology used to implement the present invention.

FIG. 4 illustrates a methodology for implementing the present invention. As previously mentioned, tag 104 must first determine whether a light select mode command is provided from RFID base station 120 in a step 404. As previously described, a light select mode command may be provided from RFID base station 120 to tag 104 via antenna 114. The signal is transferred from antenna 114 to radio frequency sub-system 112 where it is demodulated (as described above), amplified, frequency limited, and digitized. Such techniques are well-known in the data processing art and will not be described in greater detail herein. Digital control logic 110 first determines if the address in the command corresponds to an address of tag 104. Tag 104 will respond to its specific address or a limited number of group addresses. As previously mentioned, the tags that have photodetectors might be a group that is a subset of all possible tags and would respond to a particular group address. After being processed by radio frequency sub-system 112, information is communicated to digital control logic 110 which enables amplifier and digitizer 108 to respond to pulsed light information detected by photodetector 106. If RFID base station 120 informs tag 104 that a light select mode should be entered, tag 104 is then enabled to determine whether or not a coded light pulsed sequence is received in a step 408.

If a coded light pulsed sequence is received, tag 104 performs a normal RFID tag function in a step 406. Operation then begins again.

If a coded light pulsed sequence is not received, it is next determined whether or not RFID base station 120 is providing a resume normal tag function command to tag 104. If RFID base station 120 does not provide a resume normal tag function command to tag 104 via antenna 114, then tag 104 again determines whether a coded light pulse sequence has been received. If a resume normal tag function command is received from RFID base station 120, then a normal RFID tag function is executed in step 406.

It may be observed that the present patent application implements a RFID tag system 100 which uses a light beam to enable tags to communicate information. RFID base station 120 is able to send a radio frequency command to tags in a group that the operator desires to find or identify by illuminating the desired tags with a special light-beam. This technique provides greater flexibility and prevents undesired tags from responding to a light beam as well as preserving power consumption.

While it is apparent that there has been provided a RFID tag 104 having a photodetector, the implementation of the invention described herein is provided by way of example only and many other implementations may exist for executing the function described herein. For example, rather than a photodetector, tag 104 could implement an accelerometer which detects movement, as opposed to light. Such a use may be used to identify RFID tags which have been moved by a user while they are within range of a RFID base station. Similarly, the tag could implement a temperature sensor to detect body heat or some other very localized heat source. Through the use of this type of sensor, tags which have been touched by a user while they are in the range of a RFID base station could be identified. Alternatively, the tag could detect contact with the person by means of a capacitive discharge or other known proximity detection mechanisms.

In an alternative embodiment, tags could be identified which have been affected by a very localized radio frequency energy. In this implementation, the tag could have a second radio frequency sub-system which corresponds to a different, but very localized, radio frequency signal source. A single radio subsystem could be used if the radio frequency of the directional signal was the same as that of the RFID base station. The directional signal would merely use a different RF modulation technique than the RFID base station. The different RF modulation technique is well known to those with skill in the art and will not be described in greater detail herein.

Additionally, in another alternative embodiment, tags which have been affected by very localized sonic energy could be detected by having a sub-system which is responsive to such a localized source of sonic energy. Additionally, the tag could implement a sub-system which is responsive to a very localized source of a magnetic field to determine when a tag has been affected by a very localized magnetic field. Such a field could be from a permanent magnet or could be from an inductor that emits a magnetic field that varies in a known way.

While there have been described herein the principles of the invention, it is to be clearly understood to those skilled in the art that this description is made by way of example only and not as a limited to the scope of the invention. Accordingly, it is intended, by the appended claims, to cover all modifications of the invention which fall within the true spirit and scope of the invention.

What is claimed is:

1. A radio frequency identification tag, comprising:
   means for receiving a command signal;
   a detector for detecting a directional signal and generating a detected signal in response to the directional signal; and
   a digital control logic circuit coupled to the detector for receiving the detected signal and coupled to the means for receiving the command signal, the digital control logic circuit performing an operation in response to the command signal when the detected signal has a first value, wherein the command signal is provided by a radio frequency identification tag base station external to the radio frequency identification tag.

2. The radio frequency identification tag of claim 1 wherein the directional signal is provided by a light source.

3. The radio frequency identification tag of claim 1 wherein the detected signal has the first value when the detector detects an input signal having a predetermined wavelength and frequency.

4. The radio frequency identification tag of claim 1 wherein the digital control logic circuit detects an input signal having a predetermined pattern.

5. The radio frequency identification tag of claim 4, wherein the digital control logic circuit performs the operation when the input signal has the predetermined pattern.

6. The radio frequency identification tag of claim 1, further comprising:
   a digitizer coupled to the detector for receiving the detected signal, the digitizer digitizing the detected signal to generate a digitized signal.

7. The radio frequency identification tag of claim 1 wherein the digital control logic circuit generates a command output signal during performance of the operation.

8. The radio frequency identification tag of claim 7 further comprising:
   a radio frequency sub-system coupled to the digital control logic circuit for receiving the command output signal; and
   an antenna coupled to the radio frequency sub-system for selectively communicating the command output signal.

9. The radio frequency identification tag of claim 7 wherein the digital control logic circuit generates a plurality of control signals during performance of the operation.

10. The radio frequency identification tag of claim 9, further comprising:

a memory coupled to the digital control logic circuit for receiving the plurality of control signals.

11. The radio frequency identification tag of claim 10 wherein the plurality of control signals enable the memory to output a data value stored therein.

12. A radiofrequency identification tag, comprising:

means for receiving a command signal;

a detector for detecting a directional signal and generating a detected signal in response to the directional signal; and a digital control logic circuit coupled to the detector for receiving the detected signal and coupled to the means for receiving the command signal, the digital control logic circuit performing an operation in response to the command signal when the detected signal has a first value, wherein the digital control logic circuit generates a command output signal during performance of the operation, wherein the digital control logic circuit generates a plurality of control signals during performance of the operation, wherein the radio frequency identification tag further comprises a memory coupled to the digital control logic circuit for receiving the plurality of control signals, wherein the plurality of control signals enable the memory to output a data value stored therein, wherein the command output signal provides the data value to a base station external to the radio frequency identification tag.

13. The radio frequency identification tag of claim 10 wherein the plurality of control signals enable the memory to store a data value therein.

14. The radio frequency identification tag of claim 13 wherein the command output signal provides an acknowledge signal to a base station external to the radio frequency identification tag.

15. The radio frequency identification tag of claim 1 wherein the detector detects a pointing beam of the directional signal.

16. A radio frequency identification tag, comprising:

means for receiving a command signal;

a detector for detecting a directional signal and generating a detected signal in response to the directional signal; and a digital control logic circuit coupled to the detector for receiving the detected signal and coupled to the means for receiving the command signal, the digital control logic circuit performing an operation in response to the command signal when the detected signal has a first value, wherein the detector detects a pointing beam of the directional signal, wherein the detector detects a helper beam of the directional signal and wherein the digital control logic circuit indicates the helper beam has been detected.

17. The radio frequency identification tag of claim 16 wherein the digital control logic circuit indicates that the directional signal should be moved such when the helper beam has been detected.

18. A method for performing radio frequency identification in a radio frequency identification tag, comprising the steps of:

receiving a first command signal to enable the radio frequency identification tag to operate in a first mode of operation;

detecting a directional signal and generating a detected signal in response to the directional signal;

performing a first radio frequency identification operation in response to the first command signal when the detected signal has a first value; and receiving a second command signal to enable the radio frequency identification tag to operate in a second mode of operation.

19. The method of claim 18, further comprising the step of:

generating the detected signal having the first value when the directional signal is a light having a preselected wavelength.

20. The method of claim 18, further comprising the step of:

generating the detected signal having the first value when the directional signal is a light having a preselected pattern.

21. The method of claim 18, further comprising the step of:

generating a plurality of control signals during performance of the first radio frequency operation.

22. The method of claim 18, further comprising the step of:

generating a command output signal during performance of the first radio frequency identification operation.

23. The method of claim 21, further comprising the steps of:

coupling a memory to the control signal to receive the plurality of control signals;

enabling the memory to output a data value stored therein in response to the plurality of control signals; and providing the data value to a base station external to the radio frequency identification tag.

24. The method of claim 21, further comprising the steps of:

coupling a memory to the control signal to receive the plurality of control signals;

enabling the memory to store a data value therein in response to the plurality of control signals; and providing an acknowledge signal to a base station external to the radio frequency identification tag.

25. A radio frequency identification tag comprising:

a radio frequency sub-system for receiving a command signal from a source external to the radio frequency identification tag;

a detector for detecting a directional signal and generating a detected signal in response to the directional signal; and a digital control logic circuit coupled to the detector for receiving the detected signal, the digital control logic circuit performing an operation in response to the command signal when the detected signal has a first value.

26. A method for performing radio frequency identification in a radio frequency identification tag, comprising the steps of:

receiving from a source external to the radio frequency identification tag a command signal;

detecting a directional signal and generating a detected signal in response to the directional signal; and performing a radio frequency identification operation in response to the command signal when the detected signal has a certain value.

* * * * *